Sept. 30, 1958  C. K. CLARK ET AL  2,854,419
TREATING FLOATING SOAP AND PRODUCT OBTAINED THEREBY
Filed Jan. 21, 1955
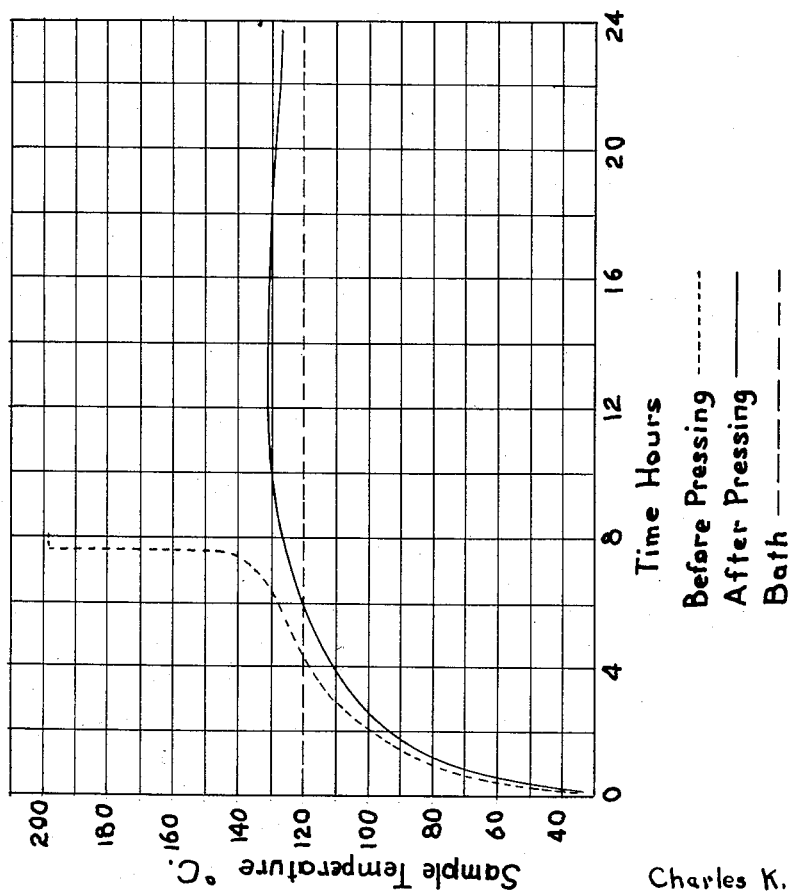
Charles K. Clark
Robert O. Nason
INVENTORS
BY Laura H. Wilson
Attorney

2,854,419
TREATING FLOATING SOAP AND PRODUCT OBTAINED THEREBY

Charles K. Clark and Robert O. Nason, Crossett, Ark., assignors to Crossett Chemical Company, a Division of The Crossett Company, Crossett, Ark., a corporation of Arkansas Application January 21, 1955, Serial No. 483,369

14 Claims. (Cl. 252—368)

This invention relates to the manufacture of an improved floating soap from the crude floating soap contained in black liquor resulting from the digestion of pulp wood by the kraft or soda cooking processes and combination or modifications of these processes.

It is well-known in the pulp and paper art that the black liquor from the above processes contains among other things the sodium salts of rosin acids and of fatty acids which separate out or float on top of the black liquor when it is evaporated to recover the alkali values therefrom. The art knows this floating material by various names, e. g. floating soap, soap skimmings, etc.

For the uses of which we are aware it is conventional practice to dry the floating soap after it is skimmed off the black liquor. Various methods are known for drying floating soap including spray drying, drum drying, pan drying, and combinations of these. While all of these drying methods are applicable to the present invention, drum drying is preferred.

Although dried floating soap has a number of industrial applications, an important one of which is an ingredient in oil well drilling fluids (see U. S. P. 2,468,658), it has some undesirable characteristics such as a substantial tendency to heat spontaneously and to cake in storage, and to dust in handling, as well as an undesirably low bulk density and low rate of dissolution in water.

Its tendency to heat spontaneously during shipment and storage is a serious drawback. Caking during storage causes diffculty in use, especially in applications requiring the dried soap to be dissolved in water. Low bulk density results in excessive storage space requirements and high costs for shipping containers. The slow rate of dissolution in water is a disadvantage when the dried soap is used in water solution.

Of these, the most troublesome characteristic is its far too great a tendency to heat spontaneously. The dried floating soap has heated spontaneously in a number of instances while in storage and in other instances while in transit. In heating spontaneously, the floating soap rises in temperature (usually gradually) to a value substantially above ambient temperature which causes the particles of the floating soap to fuse into a charred and useless mass. Such an occurrence results in a serious financial loss.

The term "floating soap" is used herein to include soap skimmings before any effort has been made to remove any portion of its relatively high water content as well as soap skimmings from which substantially all of the water has been removed.

An object of this invention is an improved floating soap and means of manufacturing same. A further object is the manufacture of a stabilized and otherwise improved floating soap. A still further object is the manufacture of floating soap in which the undesirable characteristics of the prior art are overcome or at least minimized. The above and other objects will be apparent from the description of this invention given hereinafter.

We have found that the above and other objects are accomplished according to this invention by carrying out the process which broadly comprises drying crude floating soap from black liquor and then pressing the dried floating soap. More specifically, it is preferred that the crude floating soap be drum dried, pressed while warm into sheets by passing between rolls, and then flaked for most uses.

The accompanying drawing is related to Example 3 hereinafter and will be explained in connection therewith.

The following examples illustrate preferred embodiments of the instant invention.

EXAMPLE 1

Floating soap was skimmed off of kraft black liquor and held in large storage tanks for a sufficient time to allow the entrained liquor to separate. This gave a crude floating soap with an average solids content of about 65%. The crude floating soap was fed between two revolving drums whose surfaces were maintained at a temperature of about 135° C.–150° C. The floating soap was thus dried to a moisture content not exceeding about 5% (usually being 1%–5%) and then doctored off the drum in the form of very thin, hot, sticky, fluffy and discontinuous films. The dried floating soap fell onto a screw conveyor from which it was picked up by a blower and sent to a cyclone separator. The dried and cooled floating soap passed from the cyclone separator into multi-wall paper bags which were closed and sent to storage. Each bag was loaded with 50 pounds of floating soap.

In passing through the fan and cyclone separator in the presence of a large volume of air, the large, plastic, sticky, thin films of floating soap coming from the drums were further dried, reduced in tackiness, cooled, and disintegrated to a coarse powder in suitable form to be bagged. This product had a bulk density of 12–18 pounds per cubic foot.

EXAMPLE 2

Portions of the dried floating soap from Example 1 were obtained just prior to the bagging operation therein and further processed as follows.

This floating soap was pressed into sheets of roughly $1/16''$ thickness by passing same between two opposing 8" diameter steel pressure rolls. The surfaces of the rolls were maintained at a temperature of about 40° C., which is approximately the temperature of the floating soap discharging from the cyclone in Example 1 above. Then the sheets were broken up into relatively small flakes all of which passed a screen having $3/8''$ openings. This gave compressed floating soap having a bulk density of 35 pounds per cubic foot and an absolute density of 67 pounds per cubic foot (1.07 g./cc.).

One roll was rotated by conventional driving means at a speed of about 4 R. P. M. The opposing roll idled and was rotated merely by the friction imparted by the driven roll through the floating soap being pressed, the idling roll rotating at a speed slightly less than that of the driven roll.

In order to obtain a direct comparison of their properties, the product of Example 1 and the product of Example 2 above were subjected to a number of identical tests. The conditions and results of these tests are described below. Hereinafter these products will sometimes be referred to as unpressed floating soap and pressed floating soap, respectively.

EXAMPLE 3

*Spontaneous heating*

The Mackay test, with modifications indicated below, was employed to determine the tendency of various samples of dried floating soap to heat spontaneously. This is a standard accelerated test originally developed for determining the spontaneous heating tendency of oils. See Scott, "Standard Methods of Chemical Analysis," 5th edition, page 1782, D. Van Nostrand Co., Inc.

In order to adapt the Mackay test to better meet the testing requirements of this invention, the test sample was placed in a wire gauze basket made of stainless steel and the basket was suspended in an air jacket immersed in a constant temperature oil bath. One end of a thermocouple was inserted into the center of the sample and the other end was connected to a temperature recorder. Bath temperatures of 100° C., 110° C., 115° C., and 120° C. were used and the test periods were varied from 24 hours to 96 hours.

In the Mackay test the sample temperature gradually rises to bath temperature over a period of about 6 hours. Thereafter, if the sample is reactive (i. e. unstable toward spontaneous heating) its temperature will continue to rise gradually a few degrees above bath temperature and then its temperature will suddenly begin to rise rapidly, indicating that a vigorous exothermic reaction is taking place. If the sample is non-reactive (i. e. stable toward spontaneous heating) its temperature will remain at or only slightly above bath temperature.

The Mackay test is an accelerated test, designed to determine in a few hours what may be expected to occur during several days or weeks under practical storage conditions. In the Mackay test the sample is subjected to much more severe conditions than would be encountered in storage. Accordingly, whereas a mass of dried floating soap in storage may gradually rise to a temperature sufficiently high to damage the soap, a sample of the same material in the Mackay test will exhibit a sudden sharp rise in temperature after a few hours' exposure. In both cases the soap particles are fused into a charred, useless mass.

Tables 1 and 2 below give the data and test conditions resulting from applying the Mackay test to unpressed and pressed floating soap. Among other data, Table 1 shows the reaction temperature or temperatures at which the sample began to react (column 3), the time which had elapsed under the test conditions when the reaction started (column 6), the maximum temperature the sample reached (column 4), the time which had elapsed when the sample reached its maximum temperature (column 7), and crossover or the time which had elapsed when the sample reached the bath temperature (column 5). Table 2 gives data under the same headings as Table 1 except columns 3 and 6 of Table 1 were not needed in Table 2 since the samples did not react or heat spontaneously. In the samples which exhibited the sudden temperature rise characteristic of the unstable material, the particles of the floating soap fused into a single lump, whereas the samples which did not react in this way remained free flowing after the test was completed.

TABLE 1.—UNPRESSED FLOATING SOAP SPONTANEOUS HEATING

| Col. 1 | 2 | 3 | 4 | 5 | 6 | 7 |
| --- | --- | --- | --- | --- | --- | --- |
| Sample | Temp., ° C. | | | Hours to— | | |
| | Bath | Reaction | Maximum | Crossover | Reaction | Maximum |
| 1 | 110 | 144 | 185 | 7.2 | 17.6 | 18.7 |
| 2 | 110 | 142 | 183 | 6.3 | 16.5 | 17.5 |
| 3 | 110 | 127 | 192 | 6.5 | 11.5 | 12.1 |
| 4 | 120 | 140 | 194 | 3.6 | 5.4 | 5.9 |
| 5 | 120 | 143 | 193 | 4.7 | 6.2 | 6.7 |
| 6 | 120 | 140 | 198 | 4.4 | 7.4 | 7.7 |

TABLE 2.—PRESSED FLOATING SOAP SPONTANEOUS HEATING

| Sample | Temp., ° C. | | Hours to— | |
| --- | --- | --- | --- | --- |
| | Bath | Maximum | Crossover | Maximum |
| 1 | 120 | 132 | 5.6 | 12.4 |
| 2 | 120 | 132 | 5.6 | 11.0 |
| 3 | 120 | 131 | 5.8 | 11.0 |
| 4 | 120 | 135 | 5.8 | 11.8 |
| 5 | 120 | 134 | 6.7 | 11.3 |

The original data for Example 3 were obtained on a conventional circular recorder chart as continuous lines which were drawn by the automatic recorder connected to thermocouples in the samples under test, as mentioned in the first part of Example 3 above. The data in Tables 1 and 2 above were obtained by reading off values at appropriate points on the original recorder charts. The drawing accompanying this application is a graphical representation of the curves drawn by the automatic recorder when testing sample number 6 of Table 1 and sample number 3 of Table 2. These are shown as the dotted line curve and the solid line curve, respectively, in the drawing.

EXAMPLE 4

*Rate of solution in water*

In comparing the rate of solution in water of the unpressed floating soap with that of the pressed floating soap, the same volume of 10% aqueous solutions were prepared with each using a mechanical stirrer. The unpressed floating soap formed a gelatinous mass in contact with water and required two hours to dissolve completely, whereas the pressed floating soap did not agglomerate and was completely dissolved in one-half hour.

EXAMPLE 5

*Dustiness*

In order to check dustiness, trial samples of the pressed and unpressed floating soap were manufactured, stored, shipped to the field and employed under the usual circumstances in preparing drilling muds and for other uses. Our observations and the reports on field use clearly indicated a marked superiority of the pressed floating soap over the unpressed as regards dustiness.

EXAMPLE 6

*Caking tendency*

Fifty pound bags of pressed floating soap and unpressed floating soap were stored under the usual warehouse conditions over extended periods of time. In each case it was noticed that the unpressed floating soap caked badly, especially near the bottom of the stacks, whereas under the same test conditions no caking of the pressed floating soap was observed.

EXAMPLE 7

*Density*

The bulk density of the unpressed floating soap was found to be only 12–18 pounds per cubic foot as compared with 35 pounds per cubic foot (1.07 g./cc.) bulk density and about 67 pounds per cubic foot absolute density for the pressed floating soap.

EXAMPLE 8

*Pressure*

Since it is not feasible to directly determine or estimate the pressure to which the floating soap is subjected as it passes between a set of pressure rolls, other means were used to measure the effect of pressure as accurately as possible.

Accordingly, portions of the dried floating soap from Example 1 were obtained just prior to the bagging operation therein and subjected to the following test conditions. Thee series of samples were prepared over a range of pressures, employing a different temperature for each series and substantially the same amount of floating soap for each sample. Samples of practically uniform size were prepared by placing the floating soap in a die of one square inch cross sectional area and applying the desired pressure in a hydraulic press. Hereinafter this will be referred to as a platen press as distinguished from a roll press. The conditions of preparing these samples and the results obtained are summarized in Table 3 below.

TABLE 3.—PRESSURE

| Sample No. | Temp., °C. | Pressure, lb./sq. in. | Density, g./cc. |
|---|---|---|---|
| 1 | 27 | 2,000 | 0.95 |
| 2 | 27 | 3,000 | 1.05 |
| 3 | 27 | 4,000 | 1.07 |
| 4 | 27 | 5,000 | 1.08 |
| 5 | 27 | 17,000 | 1.08 |
| 6 | 45 | 1,250 | 1.00 |
| 7 | 45 | 1,750 | 1.08 |
| 8 | 45 | 2,000 | 1.08 |
| 9 | 65 | 1,000 | 1.06 |
| 10 | 65 | 1,250 | 1.06 |
| 11 | 65 | 1,500 | 1.08 |

By analyzing Table 3 above and by comparing the densities and general characteristics, such as color, texture, outward appearance, etc., of these samples made in the platen press with the floating soap made by roll pressing under satisfactory conditions, the following were evident. (1) With each of the three temperatures employed the density of the samples made in the platen press increased with pressure to a maximum value beyond which additional pressure caused no increase in density, and for all practical purposes, the quality of the product followed the same pattern. (2) This improvement in product was gradual. The gradual improvement in product with increased pressure was accompanied by a gradual darkening in color from the light tan of the starting material to the dark brown of the product pressed to the maximum density shown. As the pressure was increased to give products having the density range shown, the outward appearance thereof varied from a rough granular surface to a vitreous surface. No substantial difference in effect of pressure nor in the above criteria by which the effect of pressure became apparent were found between roll pressing and pressing in a platen press.

EXAMPLE 9

*Application of pressure by extrusion*

A portion of the dried floating soap from Example 1 was obtained just prior to the bagging operation therein and placed in a 1⅛" diameter steel die, fitted with a plunger. The temperature of the floating soap when charged to the die was 27° C. In one end of the die there was a 1/16" diameter orifice. A hydraulic press was used to subject the plunger to a pressure of 8000 p. s. i. which forced the plunger into the die. This caused the soap particles to coalesce and to flow out through the orifice in the form of a homogeneous and continuous string. The string was broken up into small cylindrical pieces. This product had satisfactory properties and was substantially improved as compared with conventional floating soap. Its properties were similar to the properties of the floating soap made by roll pressing and by platen pressing.

The above examples are given as illustrations of this invention and are not intended as limitations thereof except as recited in the claims attached hereto. The present invention broadly relates to an improved floating soap and process of manufacturing same which comprises drying the crude floating soap from black liquor and then pressing the dried floating soap.

The conditions of practicing this invention may be varied widely without departing from the spirit and scope thereof. The invention has been carried out wherein temperatures of 40° C.–110° C. of the surface of the pressure rolls were employed. While temperatures below and above this range are operable, it is less desirable to employ them. At lower temperatures difficulty is apt to be encountered in getting the particles to adhere together into a uniformly densified sheet, whereas the use of higher temperatures approaches the temperature at which the floating soap is apt to be damaged by oxidation or other means.

Temperatures falling in the lower portion of this range gave good results and are preferred. A chief reason for this preference is that they are advantageous from the process engineering standpoint, i. e. the surface of the rolls will reach and maintain these lower temperatures in actual operation because of the temperature of the dried floating soap as it is taken from the cyclone of the drum drying operation to be pressed and also because of the heat of friction produced in pressing. Therefore, no application of heat is necessary since the heat naturally emanating during the pressing step is sufficient.

As pointed out in Example 8 above, pressure varies inversely with temperature. While pressures of 1,000–17,000 p. s. i. have been successfully employed (Example 8), preferably the pressure will be only as high as necessary to give substantially the maximum density of product under the other conditions involved. Near the preferred temperature of 40° C., i. e. at 45° C., this pressure was found to be about 1750 p. s. i. While pressures outside the ranges disclosed herein are operable within the scope of this invention, they are less desirable. Substantially the same considerations apply whether the pressure is supplied by rolls, platens or extrusion.

Of course, the extrusion set forth in Example 9 could be made continuous by substituting a screw feeder for the plunger. Likewise, a plurality of orifices could be employed and also the strings of soap could be subdivided into pieces of any desired size and shape by rotating vanes or other means.

Rotational speed of the pressure rolls is not critical. Good results have been obtained using 8" diameter rolls at speeds of 4–25 R. P. M. However, as compared with rotating the two opposing pressure rolls at the same speed, we have obtained better results by maintaining a difference in their rotational speeds. This may be accomplished, e. g. by employing a differential drive or by driving only one roll and allowing the other to idle and to rotate only by means of the friction imparted by the driven roll through the floating soap being pressed.

Likewise, the thickness of the pressed sheets may be varied widely as desired. Obviously the pressed sheets may be flaked into pieces of any desired size and shape as long as substantial powdering or pulverization of the floating soap does not result. As pointed out hereinbefore, the chief purpose in flaking is to obtain greater convenience in storing, handling and using.

It is clear from the foregoing that this invention constitutes a marked improvement over the prior art. Although the process of this invention is relatively simple, it gives a useful product which is far superior to that of the art. As compared to the product of the art, the improved product of the instant invention has the highly desirable properties of being much less prone to heat spontaneously and of being virtually free of the tendency to fuse and char if for any reason it is subjected to elevated temperatures, which properties represent substantial improvements from the standpoint of safety and economy. Likewise, the improved product has much less tendency toward dusting and caking, which obviously are very important improvements from the standpoint of health hazard, waste and ease of application. The improved product of this invention also dissolves in water much more readily than that of the art, thereby rendering it substantially more desirable for uses requiring it in aqueous solution.

As many apparently widely different embodiments of this invention may be made without departing from the spirit and scope thereof, it is to be understood that the invention is not limited to the specific embodiments thereof except as defined in the appended claims.

What is claimed is:

1. The process which comprises at least partially drying a floating soap obtained as a by-product of woodpulp digestion processes and containing a substantial portion of the impurities naturally present therein compressing said partially dried soap to an absolute density of at least about 0.95 gram per cubic centimeter and comminuting said compressed soap to produce a substantially non-caking, substantially non-dusting, particulate soap product which is resistant to spontaneous heating.

2. The process of claim 1 wherein said floating soap is compressed while hot.

3. The process of claim 2 wherein said floating soap is compressed while at an elevated temperature from the drying step.

4. The process of claim 2 wherein said floating soap is compressed by passage between pressure rolls.

5. The process of claim 4 wherein said floating soap is compressed by passage between said pressure rolls while at an elevated temperature from the drying step.

6. The process of claim 4 wherein said floating soap is compressed by passage between heated pressure rolls.

7. The process of claim 6 wherein said pressure rolls are characterized by a surface temperature of about 40° C. to about 110° C.

8. The process of claim 2 wherein said pressure rolls are rotated at different speeds.

9. The process of claim 2 wherein said floating soap is dried to a moisture content not exceeding about 5% prior to compression by passage between said pressure rolls.

10. The process of claim 1 wherein said floating soap is compressed by extrusion through an orifice under super-atmospheric pressure.

11. The process of claim 10 wherein said extrusion is effected while said floating soap is still at an elevated temperature from the drying step.

12. The process of claim 1 wherein said floating soap is compressed in a platen press.

13. The process of claim 12 wherein compression is effected while said floating soap is still hot from the drying step.

14. A particulate floating soap having an absolute density of at least about 0.95 gram per cubic centimeter, said soap being substantially anticaking, substantially non-dusting, resistant to spontaneous heating, and characterized by an improved rate of water solubility as compared with a floating soap having a substantially lower absolute density, said particulate soap being obtained as a by-product of woodpulp digestion processes and containing a substantial portion of the impurities naturally present therein.

References Cited in the file of this patent

UNITED STATES PATENTS

| | | |
|---|---|---|
| 567,006 | Ruthschman | Sept. 1, 1896 |
| 666,741 | Des Cressonnieres | Jan. 29, 1901 |
| 1,992,949 | Hodges | Mar. 5, 1935 |
| 2,087,788 | Thal | July 20, 1937 |
| 2,390,990 | Clayton | Dec. 18, 1945 |
| 2,468,658 | Dyke et al. | Apr. 26, 1949 |

FOREIGN PATENTS

| | | |
|---|---|---|
| 562,856 | Great Britain | July 19, 1944 |